United States Patent
Wang et al.

(10) Patent No.: US 9,100,555 B2
(45) Date of Patent: Aug. 4, 2015

(54) HYBRID MODE REPEATER/RE-DRIVER FOR HIGH SPEED DIGITAL VIDEO SIGNALING

(75) Inventors: Hongquan Wang, Shanghai (CN); Hongrong Zhang, Shanghai (CN); Zhengyu Yuan, Cupertino, CA (US); Ming Qu, San Jose, CA (US)

(73) Assignee: Parade Technologies, Ltd., George Town, Grand Cayman (KY)

( * ) Notice: Subject to any disclaimer, the term of this patent is extended or adjusted under 35 U.S.C. 154(b) by 838 days.

(21) Appl. No.: 13/153,245

(22) Filed: Jun. 3, 2011

(65) Prior Publication Data
US 2012/0307154 A1 Dec. 6, 2012

(51) Int. Cl.
*H04N 5/21* (2006.01)
*G09G 5/00* (2006.01)

(52) U.S. Cl.
CPC ............... *H04N 5/21* (2013.01); *G09G 5/008* (2013.01); *G09G 2330/022* (2013.01); *G09G 2370/12* (2013.01)

(58) Field of Classification Search
None
See application file for complete search history.

(56) References Cited

U.S. PATENT DOCUMENTS

| | | | |
|---|---|---|---|
| 2007/0110199 A1* | 5/2007 | Momtaz et al. | 375/350 |
| 2007/0206641 A1* | 9/2007 | Egan | 370/479 |
| 2007/0206643 A1* | 9/2007 | Egan et al. | 370/479 |
| 2008/0069267 A1* | 3/2008 | Marlett et al. | 375/296 |
| 2010/0315555 A1* | 12/2010 | Sakurai et al. | 348/563 |
| 2012/0042104 A1* | 2/2012 | Wang et al. | 710/106 |

* cited by examiner

*Primary Examiner* — Joni Richer
*Assistant Examiner* — Yi Wang
(74) *Attorney, Agent, or Firm* — Fenwick & West LLP

(57) ABSTRACT

A system and a method are disclosed for a hybrid mode re-driver which, among other advantages, reduces power consumption while maintaining signal integrity. Equalization is performed on a signal to remove distortions such as inter-symbol interference. The signal is then analyzed and the quality of the signal is assessed. In some cases, retiming is then performed on the signal to remove additional signal distortions. In other cases, retiming is not performed and is transmitted to a driver while bypassing retiming components. When retiming components are bypassed, the retiming components are placed in a state of reduced power consumption to reduce system power consumption.

16 Claims, 4 Drawing Sheets

HYBRID MODE REPEATER/RE-DRIVER FOR HIGH SPEED DIGITAL VIDEO SIGNALING

BACKGROUND

1. Field of Art

The disclosure generally relates to signal re-driver. More specifically, the disclosure relates to signal re-driver between a graphics processing unit and an external connector.

2. Description of the Related Art

Video can be transmitted from the graphics processing unit (GPU) of a system to an external connector on the outside of a PCB which allows video data to reach an external device. As the data rate of video standards increase, signal integrity becomes an increasingly significant problem to be addressed by system designers. One way to address diminished signal integrity is by re-driving or repeating the signal between the GPU and the external connector. Re-driving can remove distortion caused by system printed circuit board (PCB) traces and other internal connections.

Equalization and retiming based re-drivers can be used, but each has significant drawbacks. An equalization based re-driver can remove inter-symbol interference distortion caused by the channel from the GPU to the external connector, but is unable to remove other distortion such as random jitter and duty cycle distortion. A retiming based re-driver can clean up and re-shape video signals more thoroughly to address all distortion at any operation speed, but consumes significantly more power.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Various embodiments provide a system and method for implementing a signal re-driver. The disclosed system and method can decrease the power used in when re-driving a signal to mitigate signal distortions. In an example embodiment, a hybrid mode re-driver enables transmission of a signal between a GPU and external connector with minimal signal loss. The hybrid re-driver performs equalization on signals to reduce certain distortions such as inter-symbol interference. When sufficiently beneficial, retiming is also performed on signals. If retiming is not performed, the corresponding components can be put into a sleep mode or another low power state. Although generally described for use in conjunction with video standards such as HDMI and DVI, the described system and method can also be applied to any signal suffering from distortion.

Figure 1:
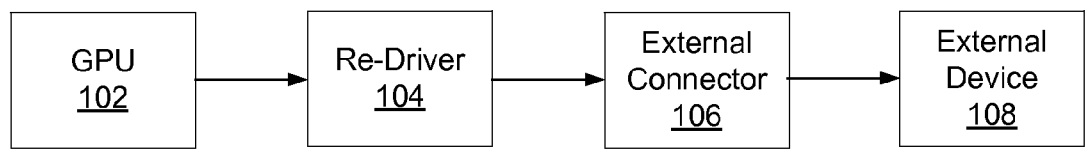
FIG. 1 is block diagram illustrating one example embodiment of a re-driver between a GPU and external connector.

Referring now to FIG. 1, illustrated is a block diagram of one example embodiment of a re-driver between a GPU and external connector to an external device. GPU 102 generates a video signal and outputs the signal to re-driver 104. In one embodiment, the video signal is in the HDMI (High-Definition Multimedia Interface) or DVI (Digital Visual Interface) video formats. The re-driver 104 is placed between the GPU 102 and an external connector 106 to reduce the signal distortion at the external connector 106. Without a re-driver, the signal outputted from the GPU 102 may degrade significantly before reaching the external connector 106. A signal is particularly susceptible to signal degradation when a high data rate is utilized. Re-driver 104 processes the signal to reduce distortion and transmits the signal to an external connector 106. Typically, the external connector 106 is coupled to an external device 108.

Figure 1B:
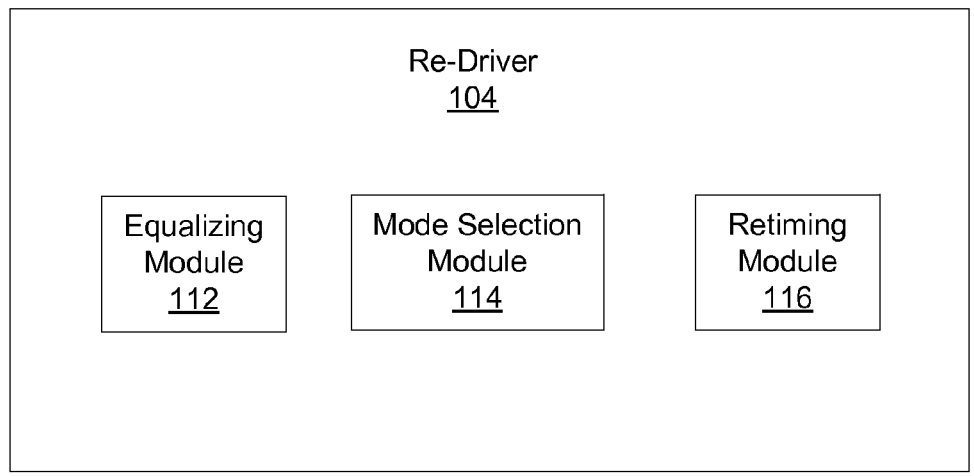
FIG. 1B illustrates one example of a high level block diagram of a hybrid mode re-driver between a GPU and external device.

FIG. 1B illustrates one example of a high level block diagram of a hybrid mode re-driver 104 between a GPU and an external device. The re-driver includes an equalizing module 112, a mode selection module 114 and a retiming module 116. A video signal is received at equalizing module 112. Equalizing module 112 then performs equalization on the signal to remove jitter and various distortions from the signal. After equalization, the mode selection module 114 analyzes the signal to determine if further operations should be performed on the signal by the retiming module 116. In one embodiment, the data rate of the signal and other various signal characteristics are included in the analysis. If it is determined that additional distortion is to be removed, retiming module 116 performs a second level of distortion removal on the signal before outputting the signal. On the other hand, if it is determined that no additional distortion is to be removed the mode selection module 114 indicates that the signal should bypass the retiming module 116 and be output. If the retiming module 116 is bypassed, components associated with the retiming module 116 can be turned off, put to sleep, or otherwise placed in a state of low power consumption to reduce overall power consumption of the re-driver 104.

Figure 2:
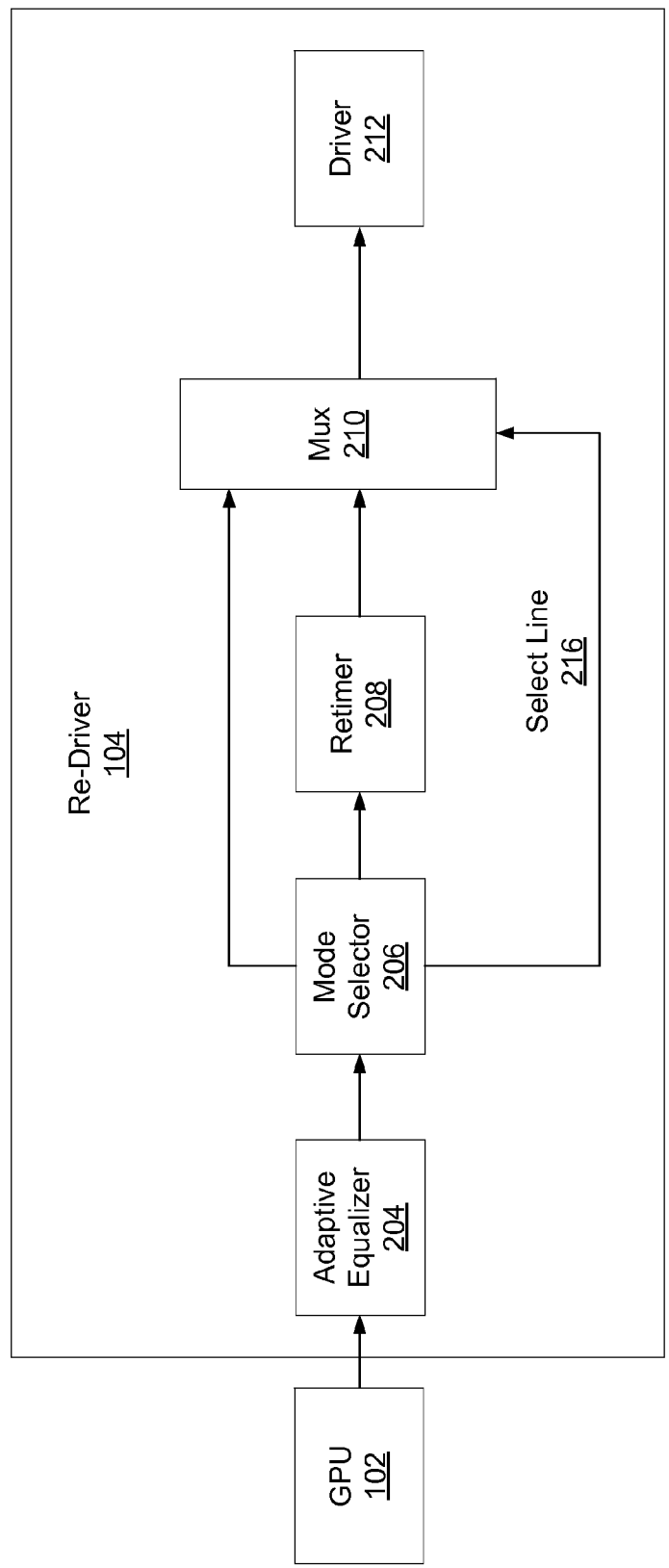
FIG. 2 illustrates one example embodiment of a hybrid mode re-driver between a GPU and external device.

Turning next to FIG. 2, illustrated is one example embodiment of a hybrid mode re-driver between a GPU and external device. The re-driver 104 includes an adaptive equalizer 204, a mode selector 206, a retimer 208, a multiplexer (mux) 210 and a driver 212. In one embodiment, a video signal is received from the GPU 102. Equalization is then performed on the received signal by the adaptive equalizer 204 to remove jitter. Equalization also has the capability to reshape both the amplitude and timing of the signal. Equalization removes certain distortion such as ISI (inter-symbol interference)

which may be caused by the channel the signal is transmitted along. In one embodiment, equalization is a suitable filter for low data speed operations to reduce distortion.

The video signal is then transmitted to the mode selector 206. The mode selector 206 analyzes the video signal to determine whether additional distortion removal should be performed on the video signal. In one embodiment, the data rate of the data signal is included in the analysis. If additional distortion removal is to be performed such as in the case of signals with a high data rate, the video signal is sent to the retimer 208 which is able to better remove distortion from a signal than equalization, but consumes significantly more power than the adaptive equalizer 204 alone. After being processed by the retimer 208, the video signal is transmitted to the mux 210. On the other hand, if it is determined that no further distortion removal is to be performed, the video signal is transmitted to the mux 210 while bypassing the retimer 208. If the retimer is bypassed, the retimer, or a portion of the components of the retimer, is turned off or placed in a state of low power consumption. In one embodiment, the instruction to enter a state of low power consumption is sent from the mode selector 206. The mode selector also sets the mux 210 to receive the correct signal by setting the mux 210 through select line 216. The mux 210 outputs the selected video signal to the driver 212 which, in one embodiment, sends the video signal to the external connector 116.

In one embodiment, the GPU 102 determines whether retiming should be performed on the video signal that the GPU is outputting and controls the mode selector 206. The GPU 102 might select the level of distortion removal that should be performed based on the resolution of the transmitted video or the features of a scene that is being transmitted. The GPU 102 may also perform any analysis that may have been performed by mode selector.

Figure 3:
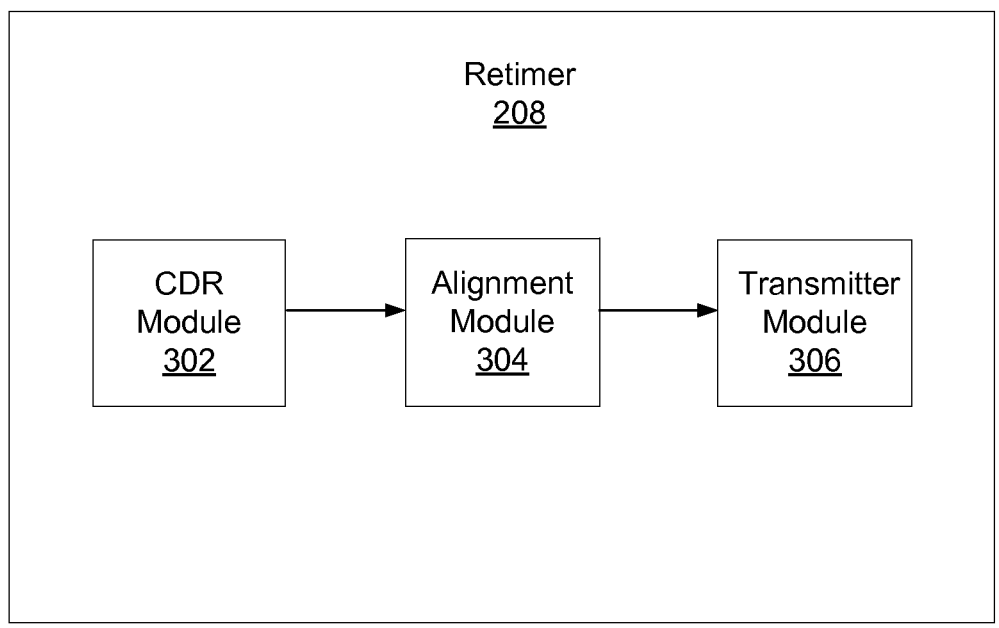
FIG. 3 illustrates one example embodiment of the retiming based portion of a hybrid re-driver.

Next, FIG. 3 illustrates one example embodiment of the retiming based portion of a hybrid re-driver. In one embodiment, the retimer 208 includes a clock and data recovery (CDR) module 302, an alignment module 304 and a transmitter module 306. In one embodiment, a video signal received from the mode selector 206 is first processed by the CDR module 302. The CDR module 302 performs clock and data recovery to accurately recover all of the information from the originally transmitted video signal. In one embodiment, the signal is de-serialized and the retimer 208 has recovers the original video data contained in the signal. Alignment module 304 uses a generated clock to re-encode the signal and prepare it for transmission. Transmitter module 306 then serializes the data and transmits the reconstructed video signal. By recovering the data and reconstructing the video signal, all distortion is removed as long as the original data is recoverable. The steps performed by the modules of the retimer 208 may be performed in any module as long as retimer 208 performs retiming based re-driving.

Figure 4:
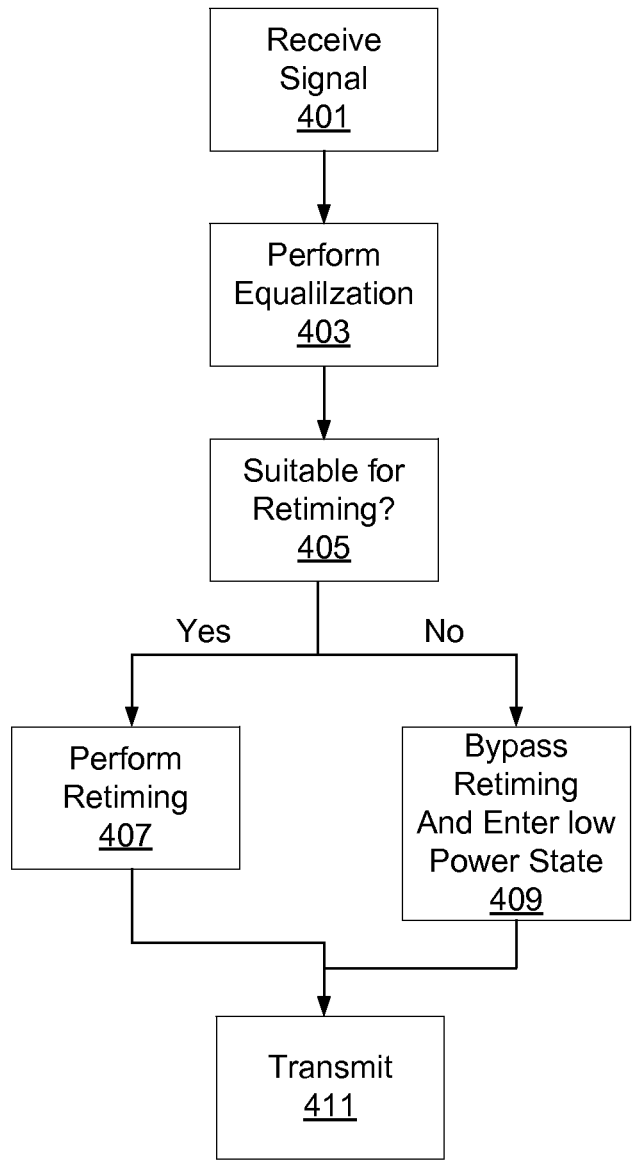
FIG. 4 is a flow chart illustrating one example embodiment of a hybrid mode re-driver.

Turning to FIG. 4, illustrated is a flow chart of a process performed one example embodiment of a hybrid mode re-driver. Initially, a video signal is received 401 from an external source such as a GPU. Equalization is performed 403 on the video signal to remove certain signal distortions. The video signal is then analyzed to determine whether it is suitable for retiming 405. In one embodiment, this analysis depends on data rate and signal quality. In some cases additional distortion removal is justified and retiming is performed 407. If the signal is of sufficient quality, retiming is bypassed 409 and components associated with retiming are placed in a state of reduced power consumption. This significantly reduces the power consumption of the system over time. Finally, the video signal is transmitted 411 through a driver to an external connector or external device. The distortion removal mode used by the hybrid re-driver on a video signal can be switched in real time based on the current conditions of the video signal.

The system and method described above enables mitigating the distortion of a signal while reducing power consumption. The mode selector assesses the benefit of re-timing based re-driving of a signal. If sufficiently beneficial, retiming is performed before transmitting the signal to an external connector. On the other hand, if no retiming is performed, the components responsible for retiming are placed in a reduced power consumption state. Hence, signal integrity is maintained while minimizing power draw when certain components are unused.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown by example with FIGS. 3 and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations (e.g., as in the example of FIG. 4) on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The phrase "in one embodiment" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and method for enabling maintaining signal integrity with reduced power consumption through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for signal re-driving, the method comprising:
receiving, by a re-driving device, a video signal from a graphic processing unit;
performing distortion removal on the received video signal using an equalizer to remove jitter from the received signal;
generating an equalized video signal by the equalizer
analyzing, by a distortion mode selector, characteristics of the equalized video signal, the characteristics of the equalized video signal including at least data rate;
determining, in real time by the distortion mode selector, whether to employ a retimer circuit to remove distortion from the equalized video signal or to bypass the retimer circuit based at least in part on the analysis, the retimer circuit configured to receive the equalized video signal from the adaptive equalizer circuit and generate a re-timed video signal by recovering a clock and data components of the received video signal and transmitting a reconstructed video signal using the recovered clock;
generating, by the distortion mode selector:
a selection signal having a first state based on a determination to re-time the equalized video signal using the retimer circuit, and the selection signal having a second state based on a determination to bypass retiming the equalized video signal;
responsive to a determination to bypass retiming the equalized video signal, sending the selection signal having the second state to a multiplexer for selecting the equalized video signal for output by the re-driver circuit, and sending an instruction to the retimer circuit for reducing the power consumption of the retimer circuit.

2. The method of claim 1, wherein the video signal is in one of the HDMI (High-Definition Multimedia Interface) or DVI (Digital Visual Interface) formats.

3. A method for signal re-driving, the method comprising:
receiving a video signal from a graphic processing unit;
performing distortion removal on the received video signal using an equalizer to remove jitter from the received signal;
generating an equalized video signal by the equalizer;
receiving a control signal indicating whether to bypass retiming the equalized video signal, the control signal generated based at least in part on one or more features of the received video signal;
responsive to the control signal, bypass retiming the equalized video signal;
reducing the power consumption of a retimer circuit used to re-time the equalized video signal; and
outputting the equalized video signal.

4. The method of claim 3, wherein the control signal is received from the graphic processing unit.

5. The method of claim 3, wherein the one or more features of the video signal includes resolution of the received video signal.

6. The method of claim 3, wherein the one or more features of the video signal includes features of a scene in the received video signal.

7. A system for signal re-driving, the system comprising:
an equalizer configured to:
receive a video signal from a graphic processing unit;
perform a first level of distortion removal to remove jitter from the received signal; and
generate an equalized video signal based at least in part on performing the first level of distortion removal on the received video signal;
a distortion mode selector coupled to an output of the equalizer and configured to:
receive a control signal indicating whether to bypass retiming the equalized video signal, the control signal generated based at least in part on one or more features of the received video signal; and
responsive to the control signal indicating to bypass retiming the equalized video signal, bypassing a retimer circuit configured to receive the equalized video signal from the equalizer circuit and generate a re-timed video signal by recovering clock and data components of the received video signal and transmitting a reconstructed video signal using the recovered clock; and
reduce the power consumption of the retimer circuit.

8. The system of claim 7, wherein the video signal is in one of the HDMI (High-Definition Multimedia Interface) or DVI (Digital Visual Interface) formats.

9. The system of claim 7, wherein the control signal is received from the graphic processing unit.

10. The system of claim 7, wherein the one or more features of the video signal includes resolution of the received video signal.

11. The system of claim 7, wherein the one or more features of the video signal includes features of a scene in the received video signal.

12. A computer program product for signal re-driving, the computer program product comprising a non-transitory computer-readable storage medium storing instructions that when executed cause at least one processor to perform the method comprising:
receiving a video signal from a graphic processing unit;
performing distortion removal on the received video signal using an equalizer to remove jitter from the received signal;
generating an equalized video signal by the equalizer;
receiving a control signal indicating whether to bypass retiming the equalized video signal, the control signal generated based at least in part on one or more features of the received video signal;
responsive to the control signal, bypass retiming of the equalized video signal;
reducing the power consumption of a retimer circuit used to re-time the equalized video signal; and
outputting the equalized video signal after.

13. The computer program product of claim 12, wherein the one or more features of the video signal are determined based at least in part on analyzing the eye pattern of the video signal.

14. The computer program product of claim 12, wherein the video signal is in one of the HDMI (High-Definition Multimedia Interface) or DVI (Digital Visual Interface) formats. the video signal includes features of a scene in the received video signal.

15. The computer program product of claim 12, wherein the one or more features of the video signal includes resolution of the received video signal.

16. The computer program product of claim 12, wherein the one or more features of the video signal includes features of a scene in the received video signal.

* * * * *